(12) United States Patent
Johnson et al.

(10) Patent No.: US 9,080,326 B2
(45) Date of Patent: Jul. 14, 2015

(54) EXTENDIBLE HEIGHT CONTAINER AND SHELTER

(75) Inventors: Brian D. Johnson, Vancouver (CA); Glen V. Thorne, Abbotsford (CA)

(73) Assignee: Weatherhaven Global Resources Ltd., Burnaby, British Columbia (CA)

(*) Notice: Subject to any disclaimer, the term of this patent is extended or adjusted under 35 U.S.C. 154(b) by 751 days.

(21) Appl. No.: 12/741,742

(22) PCT Filed: Nov. 10, 2008

(86) PCT No.: PCT/CA2008/001987
§ 371 (c)(1),
(2), (4) Date: Jun. 30, 2010

(87) PCT Pub. No.: WO2009/059432
PCT Pub. Date: May 14, 2009

(65) Prior Publication Data
US 2011/0023925 A1    Feb. 3, 2011

Related U.S. Application Data

(60) Provisional application No. 60/987,044, filed on Nov. 10, 2007.

(51) Int. Cl.
*E04B 1/344* (2006.01)
*B60P 3/34* (2006.01)
*B65D 90/14* (2006.01)

(52) U.S. Cl.
CPC ............... *E04B 1/3442* (2013.01); *B60P 3/341* (2013.01); *B65D 90/143* (2013.01); *Y10T 29/49623* (2015.01)

(58) Field of Classification Search
CPC ......... B65D 90/143; B60P 3/341; B60P 3/34; E04B 1/3442; E04B 1/3444

USPC .............. 52/64, 66, 69, 71, 79.5, 79.9, 79.12, 52/122.1, 127.7, 143; 220/1.5, 4.28, 6, 8, 220/666; 135/88.13–88.17; 296/165, 172, 296/176, 26.12, 26.15, 26.04, 26.05, 26.02, 296/26.01, 159
See application file for complete search history.

(56) References Cited

U.S. PATENT DOCUMENTS 1,578,390 A     3/1926   Brown
1,752,571 A *   4/1930   Olson ........................ 135/88.14
(Continued)

FOREIGN PATENT DOCUMENTS

CA       2012250      9/1990
CA       2100845      1/1995
(Continued)

OTHER PUBLICATIONS

International Search Report issued on Patent Cooperation Treaty Patent Application No. PCT/CA2008/001987 filed Nov. 10, 2008 (PCT Publication No. WO2009/059432).
(Continued)

*Primary Examiner* — Charles A Fox
*Assistant Examiner* — Charissa Ahmad
(74) *Attorney, Agent, or Firm* — Bruce M. Green; Oyen Wiggs Green & Mutala LLP

(57) ABSTRACT

An extendible height container is provided in which the corner elements telescope to extend the height of the container from standard ISO dimensions. An enlarged shelter can be formed from the container by providing sides which fold down to form the floor of the shelter and a flexible cover supported above the floor thus created.

10 Claims, 13 Drawing Sheets

(56) References Cited

U.S. PATENT DOCUMENTS

| | | | |
|---|---|---|---|
| 2,765,499 A | | 10/1956 | Couse |
| 2,815,762 A | * | 12/1957 | Smith ..................... 135/88.14 |
| 2,944,852 A | * | 7/1960 | Snyder ............................ 52/67 |
| 3,292,314 A | * | 12/1966 | Heise ........................... 52/79.5 |
| 3,321,233 A | | 5/1967 | Davis |
| 3,399,922 A | * | 9/1968 | Burton ......................... 296/164 |
| 3,511,529 A | | 5/1970 | Cutsinger |
| 3,801,177 A | | 4/1974 | Fylling et al. |
| 3,968,809 A | * | 7/1976 | Beavers ..................... 135/88.14 |
| 4,462,631 A | * | 7/1984 | Lange .......................... 296/160 |
| 4,465,316 A | * | 8/1984 | Roisen ......................... 296/161 |
| 4,633,626 A | * | 1/1987 | Freeman et al. .................. 52/71 |
| 4,635,412 A | * | 1/1987 | Le Poittevin ................. 52/79.5 |
| 4,689,924 A | * | 9/1987 | Jurgensen ......................... 52/67 |
| 4,918,772 A | | 4/1990 | Haile |
| 5,109,999 A | * | 5/1992 | Instone et al. .................. 220/1.5 |
| 5,143,417 A | * | 9/1992 | Philley et al. ................. 296/176 |
| 5,170,901 A | * | 12/1992 | Bersani .......................... 220/1.5 |
| 5,237,784 A | * | 8/1993 | Ros ................................ 52/79.5 |
| 5,317,857 A | * | 6/1994 | Allison .......................... 52/79.1 |
| 5,556,156 A | * | 9/1996 | Kirk ....................... 296/100.15 |
| 5,596,844 A | * | 1/1997 | Kalinowski .................... 52/79.5 |
| 5,667,267 A | * | 9/1997 | Talucci ..................... 296/26.15 |
| 5,706,846 A | | 1/1998 | Sutton |
| 5,732,839 A | * | 3/1998 | Schimmang et al. .......... 220/1.5 |
| 5,761,854 A | | 6/1998 | Johnson et al. |
| 5,765,316 A | | 6/1998 | Kavarsky |
| 5,878,903 A | * | 3/1999 | Ung ................................... 220/8 |
| 5,964,065 A | | 10/1999 | Migurski et al. |
| 6,223,479 B1 | * | 5/2001 | Stockli .............................. 52/68 |
| 6,227,397 B1 | * | 5/2001 | Kim .................................. 220/8 |
| 6,345,471 B1 | * | 2/2002 | Gyllenhammar ................. 52/69 |
| 6,655,300 B1 | | 12/2003 | Clive-Smith et al. ......... 108/53.5 |
| 6,712,414 B2 | * | 3/2004 | Morrow ..................... 296/26.01 |
| 6,772,563 B2 | * | 8/2004 | Kuhn ............................... 52/67 |
| 7,178,536 B2 | * | 2/2007 | Holtkamp ................. 135/88.13 |
| 7,328,935 B1 | * | 2/2008 | Tarin ............................. 296/163 |
| 7,396,064 B2 | * | 7/2008 | Hicks ......................... 296/26.01 |
| 7,418,802 B2 | * | 9/2008 | Sarine et al. .................... 52/79.5 |
| 7,681,941 B2 | * | 3/2010 | Freeman et al. .............. 296/168 |
| 7,717,290 B2 | * | 5/2010 | Gerding ......................... 220/629 |
| 7,828,367 B2 | * | 11/2010 | Hickam et al. ................ 296/156 |
| 8,166,715 B2 | * | 5/2012 | De Azambuja ................ 52/79.5 |
| 2003/0115808 A1 | * | 6/2003 | Morrow ............................ 52/64 |
| 2003/0175089 A1 | * | 9/2003 | Almind ............................ 410/2 |
| 2005/0120639 A1 | * | 6/2005 | Bucher et al. ..................... 52/64 |
| 2005/0180833 A1 | * | 8/2005 | Almind ............................ 410/2 |
| 2006/0113813 A1 | * | 6/2006 | Hicks ......................... 296/26.01 |
| 2006/0180190 A1 | * | 8/2006 | Ju .............................. 135/120.3 |
| 2006/0254159 A1 | | 11/2006 | Trautman et al. |
| 2007/0257031 A1 | | 11/2007 | Looker |
| 2010/0024316 A1 | * | 2/2010 | Pope ............................. 52/79.5 |
| 2010/0269419 A1 | * | 10/2010 | Gyory et al. .................... 52/79.5 |
| 2011/0023925 A1 | | 2/2011 | Johnson et al. |
| 2011/0120026 A1 | * | 5/2011 | Hache ............................ 52/79.5 |
| 2011/0297675 A1 | * | 12/2011 | Johnson et al. ..................... 220/8 |

FOREIGN PATENT DOCUMENTS

| | | | | |
|---|---|---|---|---|
| CA | 2100845 | A1 | | 1/1995 |
| CN | 1131447 | | | 9/1996 |
| DE | 1434592 | A1 | * | 11/1968 |
| DE | 29914390 | | | 1/2001 |
| DE | 202005007413 | | | 7/2005 |
| DE | 20 0004 012 697 | | | 1/2006 |
| EP | 0516517 | | | 12/1992 |
| EP | 0516517 | A1 | * | 12/1992 |
| EP | 1279621 | | | 1/2003 |
| EP | 1279621 | A1 | | 1/2003 |
| EP | 1380712 | A1 | | 1/2004 |
| FR | 2378428 | A7 | * | 8/1978 |
| FR | 2557620 | A1 | * | 7/1985 |
| GB | 191106560 | A | * | 0/1912 |
| GB | 373461 | | * | 5/1932 |
| GB | 469038 | A | * | 7/1937 |
| GB | 824738 | A | * | 12/1959 |
| GB | 1596101 | A | * | 8/1981 |
| NZ | 232768 | A | | 2/1993 |
| SE | 8201357 | | | 9/1983 |
| SU | 874915 | | | 10/1981 |
| WO | 81/00989 | | | 4/1981 |
| WO | WO 8400331 | A1 | * | 2/1984 ............... B60P 3/34 |
| WO | WO 8800141 | A1 | * | 1/1988 ............... B60P 3/34 |
| WO | 90/09098 | | | 8/1990 |
| WO | 9320297 | | | 10/1993 |
| WO | 00/69756 | A1 | | 11/2000 |
| WO | 0069756 | | | 11/2000 |
| WO | 0228747 | | | 4/2002 |
| WO | 03/076307 | A1 | | 9/2003 |
| WO | 03076307 | | | 9/2003 |
| WO | WO 2004040073 | A1 | * | 5/2004 |
| WO | 2004/076762 | A1 | | 9/2004 |

OTHER PUBLICATIONS

Patent Cooperation Treaty International Search Report dated Feb. 8, 2010 issued on PCT/CA2009/001691 filed Nov. 20, 2009 (Publ. No. WO 2010/057313).

Machine translation for CN1131447A. CN1131447A, together with an English abstract, was included in the Information Disclosure Statement filed Nov. 9, 2012.

Machine translation for DE202005007413. DE202005007413, together with an English abstract, was included in the Information Disclosure Statement filed Nov. 9, 2012.

Machine translation for EP0516517. EP0516517, together with an English abstract, was included in the Information Disclosure Statement filed Nov. 9, 2012.

Machine translation for WO81/00989. WO81/00989, together with an English abstract, was included in the Information Disclosure Statement filed Nov. 9, 2012.

English Abstract for CN1131447A.

English Abstract for DE202005007413.

English Abstract for EP0516517.

Supplementary European Search Report dated Aug. 22, 2012 for European Appl. No. 08846885.

Supplementary European Search Report for EP 09 82 7093 dated Mar. 24, 2014.

Machine English translation for DE 20 2004 012 697.

Norwegian Search Report for Norwegian Patent Appl. No. 20081917.

Machine English translation for SU 874915.

Machine English translation for DE 29914390.

Machine English translation for SE 8201357.

* cited by examiner

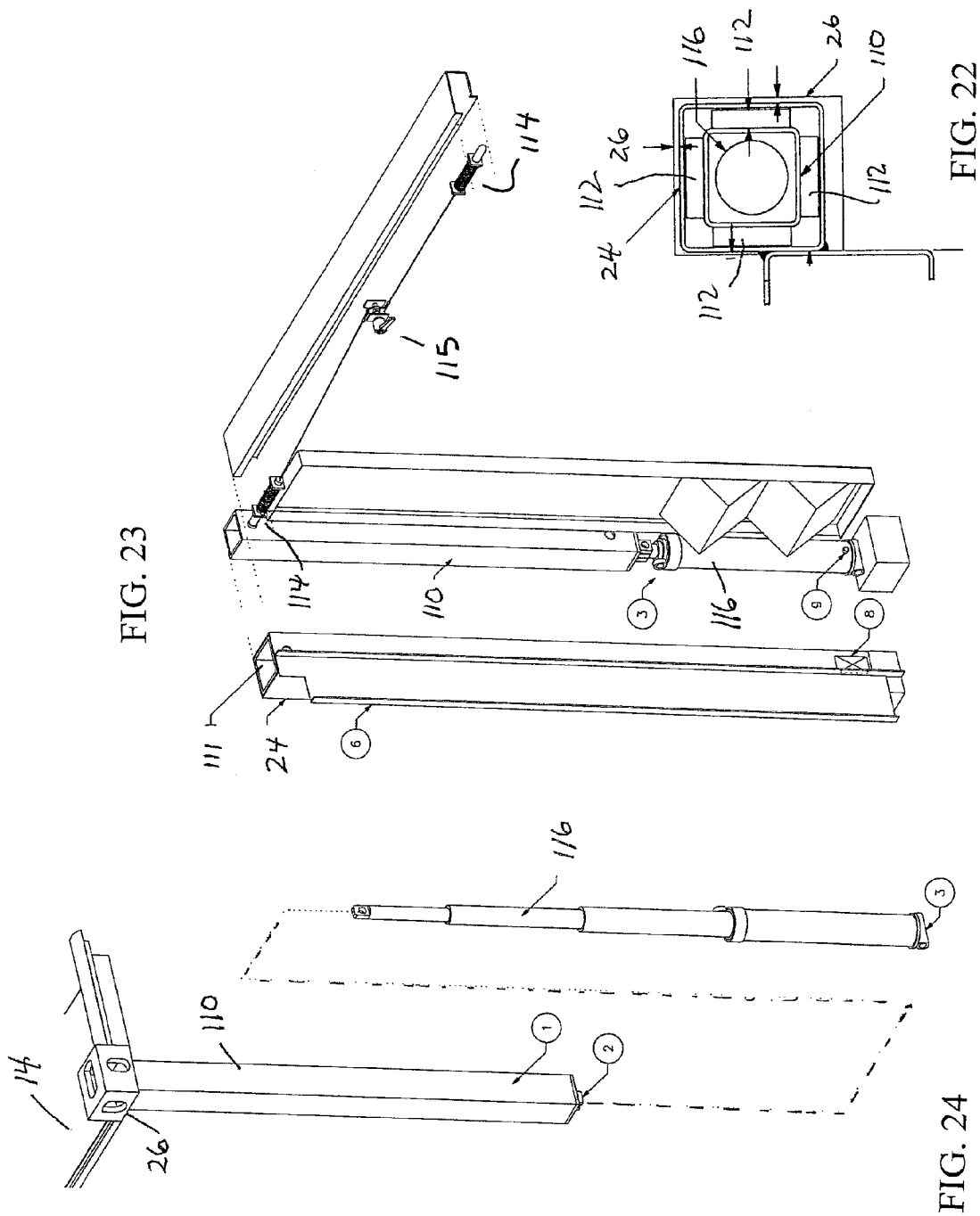

EXTENDIBLE HEIGHT CONTAINER AND SHELTER

CROSS REFERENCE TO RELATED APPLICATION

The present application claims the benefits, under 35 U.S.C.§119(e), of U.S. Provisional Application Ser. No. 60/987,044 filed Nov. 10, 2007 which is incorporated herein by this reference.

TECHNICAL FIELD

The invention relates to the field of freight shipping containers, portable shelters and more particularly collapsible portable shelters having both rigid frame and flexible fabric sections which collapse to a rigid shipping container for transporting.

BACKGROUND

Collapsible portable shelters which can be transported through ISO container shipping channels are useful for military or civilian projects of short duration or projects which are sufficiently remote that on-site construction is uneconomical. The present applicant has developed a collapsible portable containerized shelter sold commercially under the trade-mark MECC ("Mobile Expandable Container Configuration") which is the subject of prior U.S. Pat. No. 5,761,854 issued Jun. 9, 1998 and which is incorporated herein by reference. That patent discloses a portable, collapsible shelter comprising a) a rigid, hollow container having opposed vertical sides, and a horizontal top and bottom, the container having the dimensions and characteristics which satisfy the standards for ISO shipping containers; b) at least one of the vertical sides comprising a pivoting wall portion hinged along the lower edge thereof to pivot between a closed vertical position and an open horizontal position; c) means for releasably securing the pivoting wall portion in the vertical position; d) means for releasably maintaining the pivoting wall portion in the horizontal position; e) a flexible fabric cover adapted to be extended above said pivoting wall portion while the pivoting wall portion is in the lowered horizontal position; and f) means for supporting the fabric cover above the hinged vertical side while the pivoting wall portion is in the lowered horizontal position.

The MECC container can be transported through the usual ISO shipping channels, whether ship, rail or truck. It is stacked or loaded using forklift or crane. While the expanded MECC container has three times the floor area of the standard ISO container, its height remains the same, namely 2.6 m. (8.5 feet) or 2.9 m. (9.5 feet). For some applications it would be desirable to have a shelter which can be shipped as a standard ISO container but can be expanded into a shelter or storage facility with increased height in addition to or instead of increased floor area.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention provides a standard ISO shipping container which can be extended in height when not in transit. The invention further provides a collapsible portable containerized shelter which can be extended in height when not in transit. The present invention modifies standard shipping container structures to provide one or more fold-down side walls which extend the floor space of the container and are provided with a retractable fabric cover to enclose the extended space, as well as providing a roof with extended height. Means is provided for reversibly extending the corner supports to thereby raise the roof. A flexible fabric cover is adapted to be extended above the hinged vertical side while the hinged vertical side is in its lowered horizontal position, and means is provided for supporting the fabric cover above the hinged vertical side while the hinged vertical side is in the lowered horizontal position.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 22 is a cross-sectional view taken along lines B-B of FIG. 1;

FIG. 23 is an exploded view of the corner post and hydraulic cylinder assembly; and FIG. 24 is an exploded view of the corner post and hydraulic cylinder assembly.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
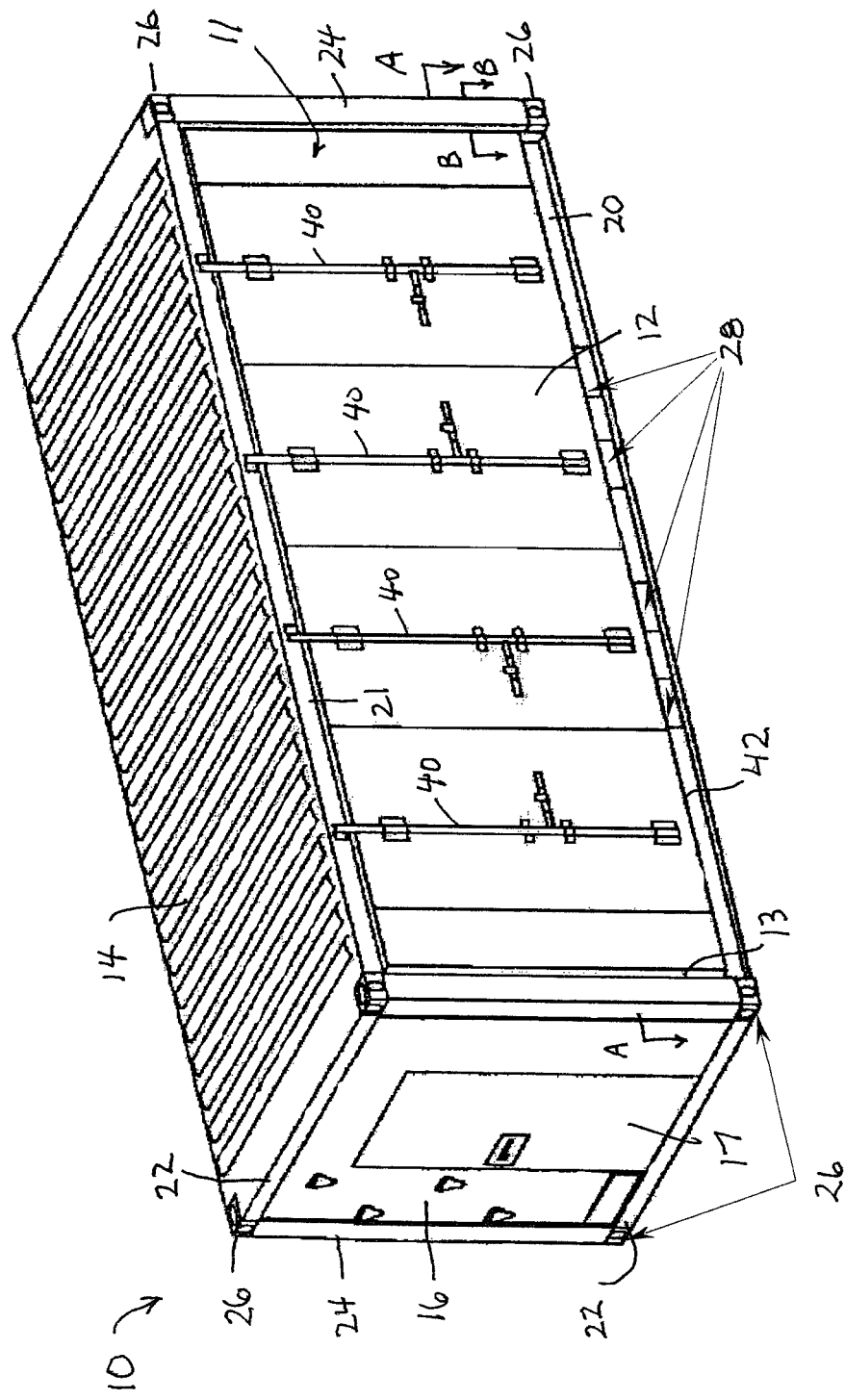
FIG. 1 is a perspective view of the invention in collapsed state ready for shipping.

With reference to FIG. 1, in its collapsed state the present invention forms a shipping container 10 conforming to ISO (International Organization for Standardization) standards, of dimensions either 6.1 m. (20 feet) or 12.2 m. (40 feet) in length and 2.44 m. (8 feet) in width and 2.6 m. (8.5 feet) or 2.9 m. (9.5 feet) in height. The width dimension may be as great as 3.05 m. (10 feet). The ISO and related standards applicable to the construction of the freight containers may be found in the following publications:

ISO 1161 Series 1 freight containers—corner fittings—specification

ISO 1496-1 Series 1 freight containers—Specification and testing—Part 1: General cargo containers for general purposes ISO standards 9000 through 9004—quality standards International Union of Railways (U.I.C.)

Transport International des Routiers (T.I.R.)

Convention for Safe Containers (C.S.C.)

Figures 2, 3:
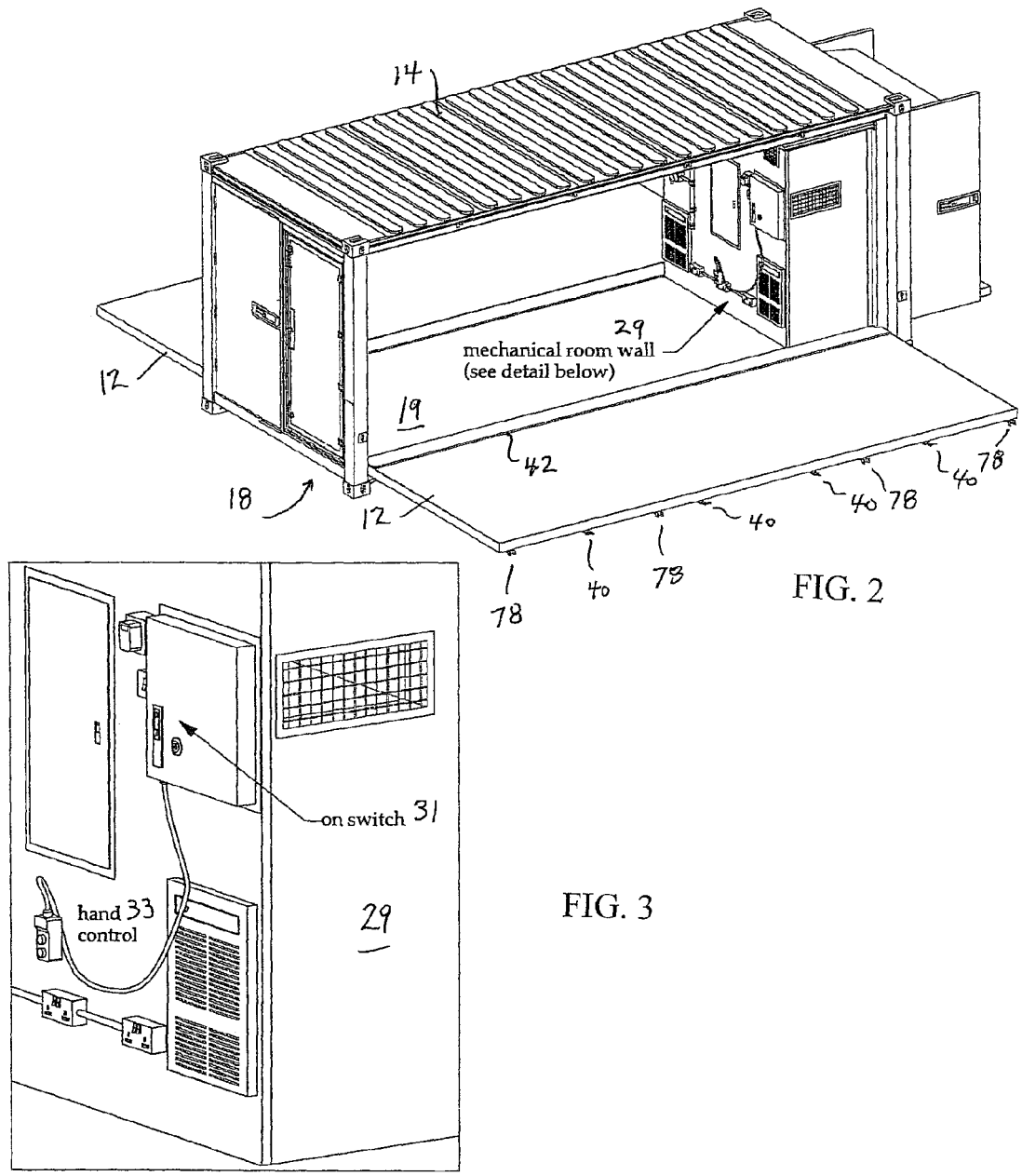
FIG. 2 is a perspective view of the invention with sides lowered.
FIG. 3 is a detail of the hydraulic control shown in FIG. 2.

The container 10 has rigid sides 11 formed of pivoting side walls 12, roof 14 and ends 16, all of which surfaces may be insulated. While both sides 11 are preferably formed of pivoting side walls 12, only one of the sides could have a pivoting side wall 12. Metal bottom side rails 20, top side rails 21, metal cross members 22, metal vertical rails 24 and corner fittings 26 provide reinforcement of the structure during shipping. Pockets 28 are provided to receive the forks of a fork lift vehicle. A flooring 19 is provided on the bottom 18 of the container (FIG. 2). A mechanical system 29 can be pre-installed in the floor or walls or elsewhere in the container 10.

Preferably roof 14 is a standard container roof of mild steel or Corten. Corner fittings 26 are manufactured of cast steel, and other frame members are of mild steel. End walls 16 and side walls 11 are formed of sections of steel panels surrounding rigid insulation foam. Flooring 19 is preferably plywood with a vinyl top layer, while the upper surface of side walls 12 is plywood with a linoleum upper layer. Floor and wall insulation is rigid polyurethane or polystyrene foam while fibreglass batt insulation is used for the roof 14.

The two side walls 12 are hinged along the base thereof at 42 to allow them to pivot from a vertical position as shown in FIG. 1, where it is retained by latches 40, to the horizontal position shown in FIG. 2, leaving an opening formed b edges 13. The hinge and wall construction can be as described in U.S. Pat. No.5,761,854. Latches 40 lock the side walls 12 in a vertical position to provide a rigid structure for shipping purposes which can be lifted through pockets 28 or the ISO corner fittings 26. Latches 40 may be anti-racking rotating locking bars as shown in FIGS. 1 and 7, or other suitable latch arrangement.

Figures 11A, 11B, 11C:
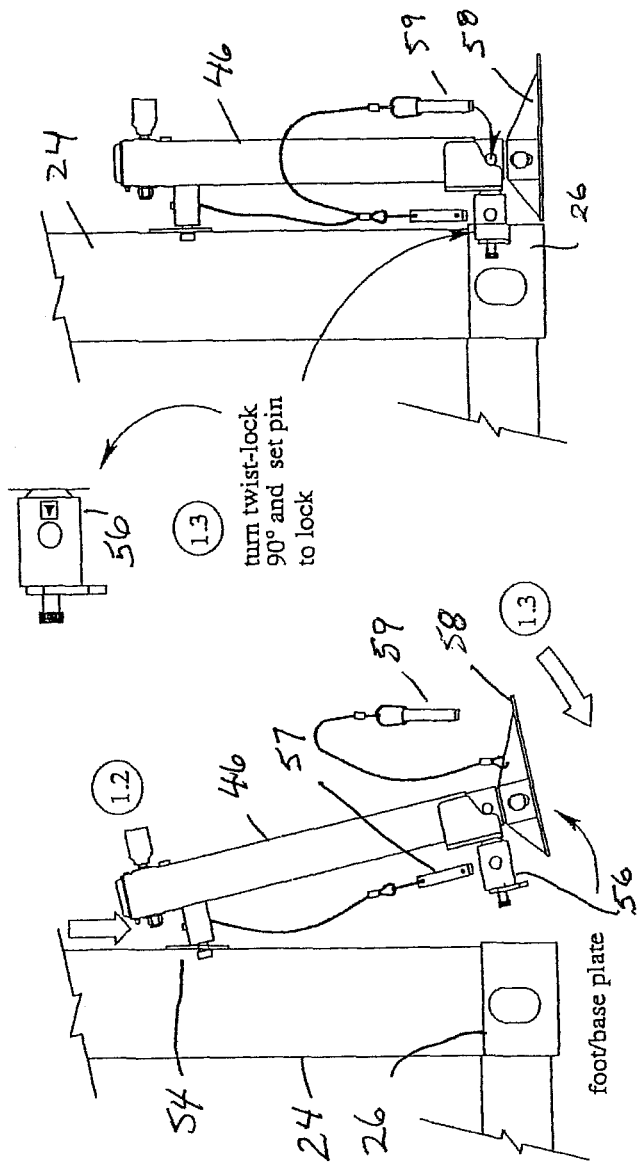
FIG. 11A-C are plan views of a corner jack.
Figure 12:
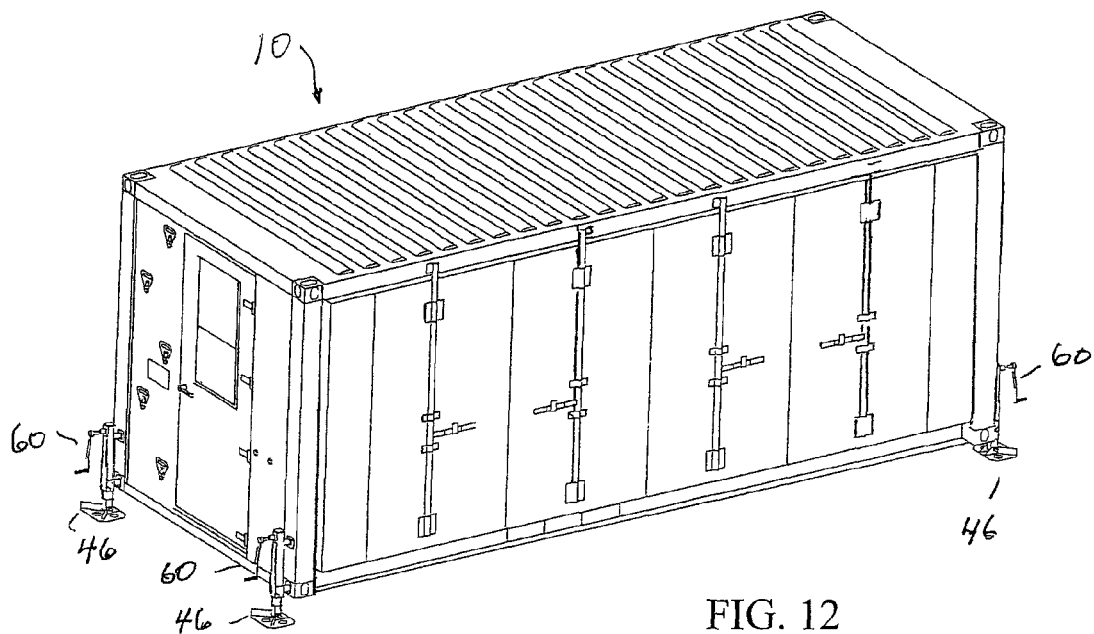
FIG. 12 is a perspective view of the invention in collapsed state with corner jacks in place.

The invention is preferably deployed on a hard surface such as tarmac, concrete or compacted soil, using a forklift or crane. As shown in FIGS. 11 and 12, corner leveling jacks 46 are attached to the vertical rails 24 and corner fittings 26. The body 48 of each jack 46 is slid down over the foot/base plate extension 50 (FIG. 11A). The bolt head 52 of the jack is pushed through a keyhole 54 on the corner vertical rail 24 and the jack is slid down to lock it in place. The jack 46 is then rotated towards the rail 24 and twist-lock 56 is inserted into the hole in corner fitting 26 and twisted 90 degrees to lock (FIG. 11B), and pin 57 inserted to lock. The foot baseplate 58 is then dropped to the ground and pin 59 inserted to lock the extension 50. Referring to FIG. 12, handles 60 are inserted into sockets of the jacks 46 and the handles are cranked to level the container, cranking two jacks at a time.

Figure 5:
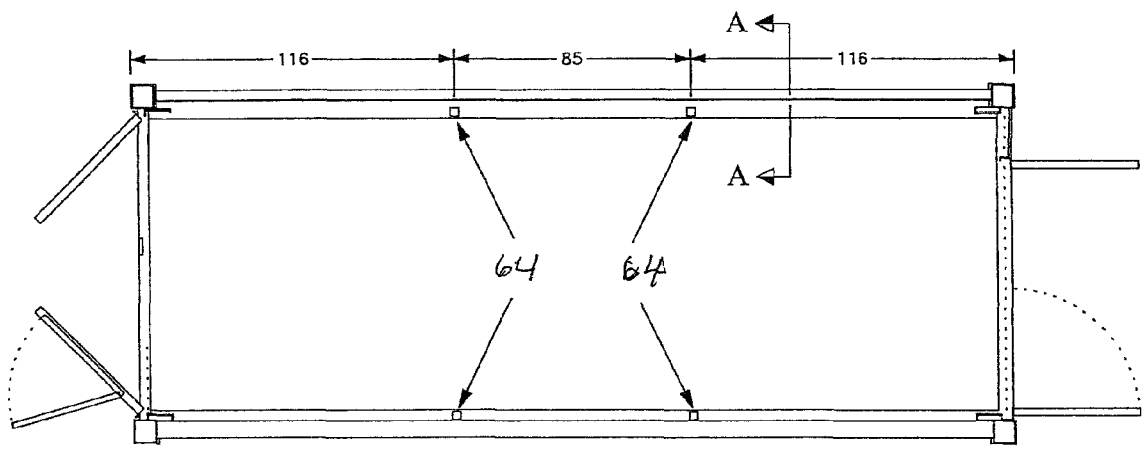
FIG. 5 is a cross-sectional view taken along lines A-A of FIG. 1.
Figure 6:
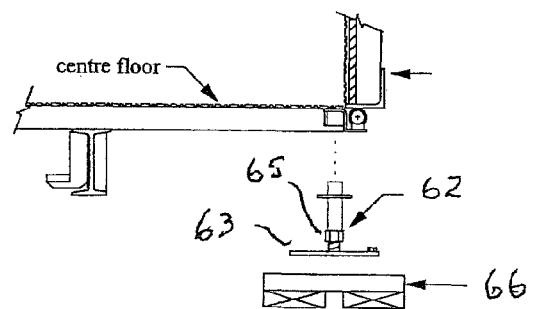
FIG. 6 is a detail view showing an intermediate support.

Prior to lowering sides 12, intermediate supports 62 are installed on the lower rails 20 at the locations 64 shown in FIG. 5 to permit large loads to be supported in the shelter. The foot 63 of support 62 is threaded so that it can be extended by rotation of nut 65. Cribbing 66 is used where the corner posts are more than 3 inches above grade.

Figure 7:
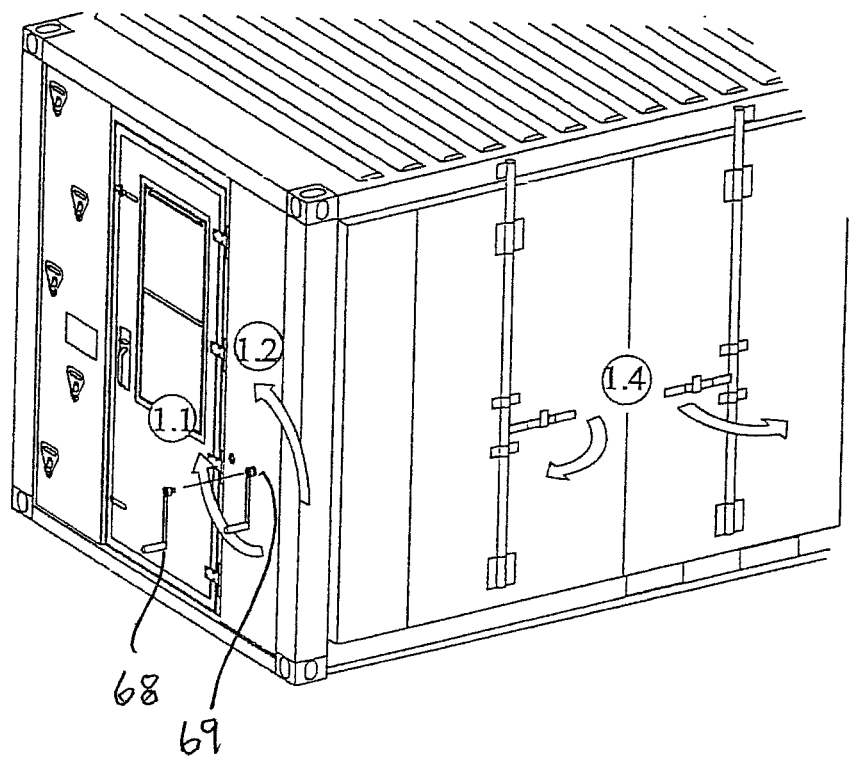
FIG. 7 is a detail perspective view showing the opening of the side latches and insertion of the winch handle.
Figure 8:
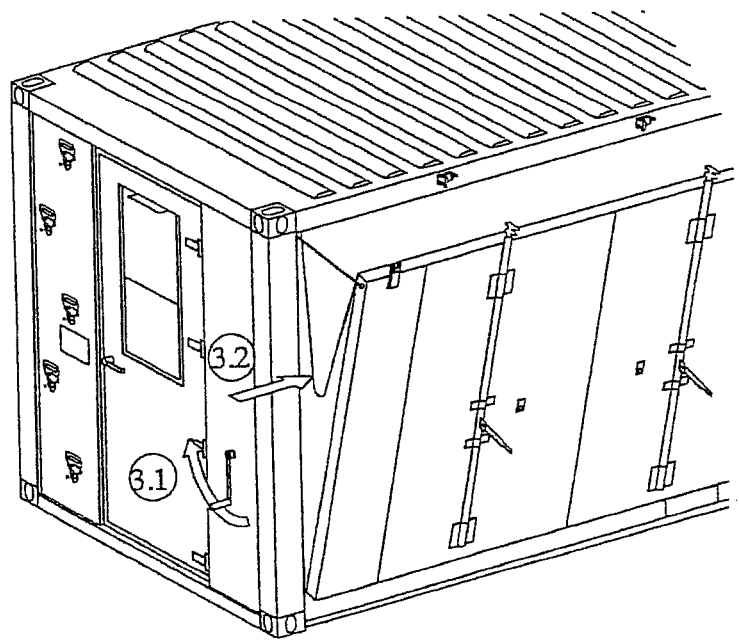
FIG. 8 is a detail perspective view showing the opening of a side.
Figure 9:
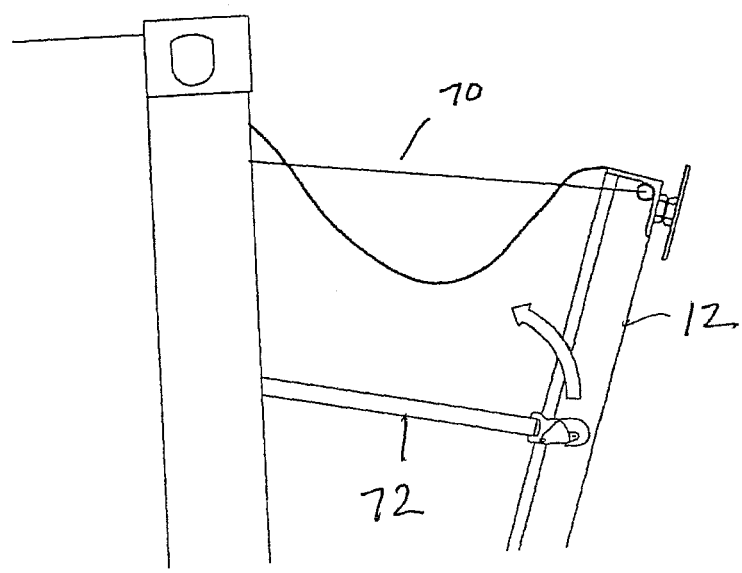
FIG. 9 is a further detail end view showing the opening of a side.
Figure 10:
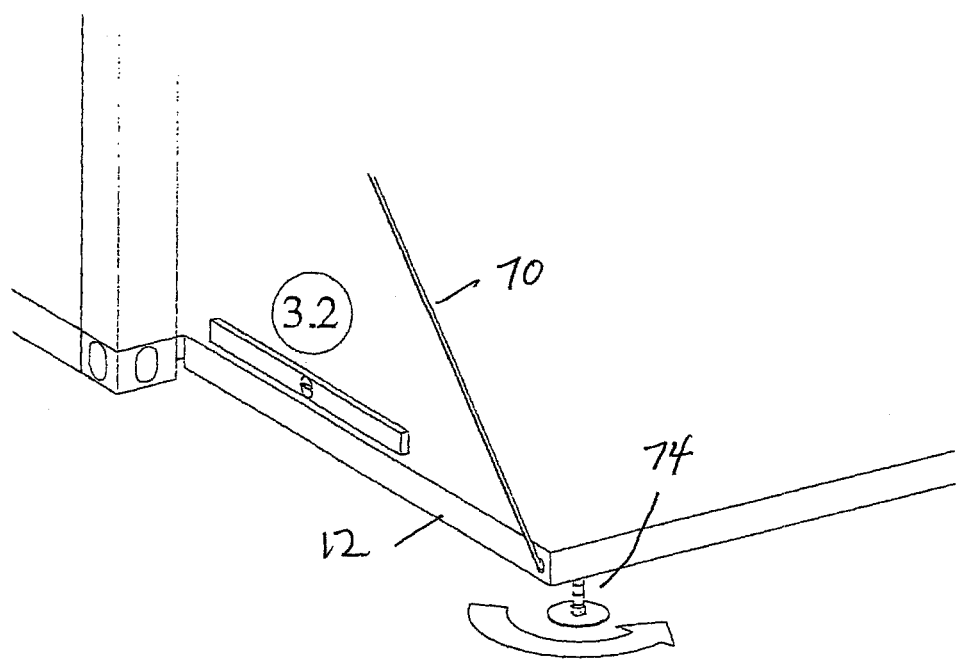
FIG. 10 is a detail perspective view showing the leveling of a side.
Figure 13:
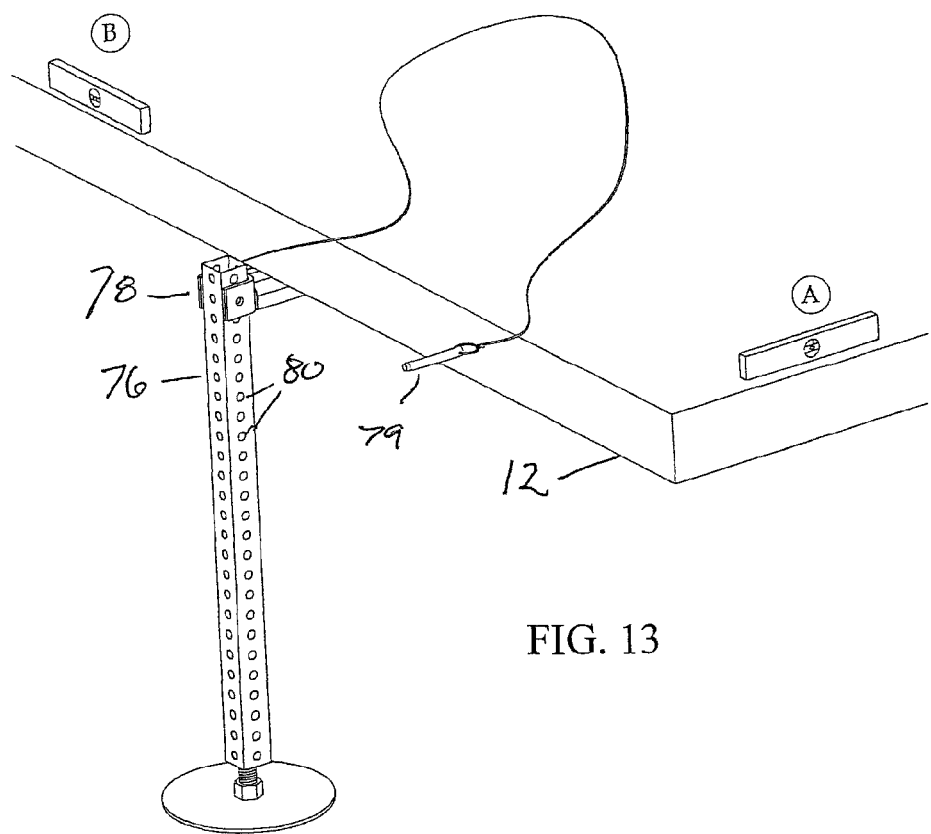
FIG. 13 is a detail view of a leveling extension for the pivoting side walls.

The sides 12 are then lowered as shown in FIGS. 7 and 8 and using a winch as described in U.S. Pat. No. 5,761,854. The winch (not shown) may be hand operated by a handle 68 as shown in FIG. 7, or may be operated by an electric motor. The winch raises and lowers sides 12 by winding up or releasing a cable or wire rope 70 attached to the upper corners of sides 12 and run over one or more pulleys and down to the winch which is attached to the fixed wall of the container. The winch may have a braking mechanism to prevent sudden slippage of the wire rope. Handle 68 is inserted into the winch drive sot 69. locking bars 40 are rotated and slid down to release side 12. The side 12 is then winched down until safety strap 72 (FIG. 9) is almost taut. Safety strap 72 is then unhooked and the side 12 lowered until close to the ground. The side is then leveled either using a threaded foot plate 74 (FIG. 10) or an extension 76 (FIG. 13) which fits in collar 78 on side 12 and is retained by pin 79 in one of the holes 80 in extension 76.

Figure 14:
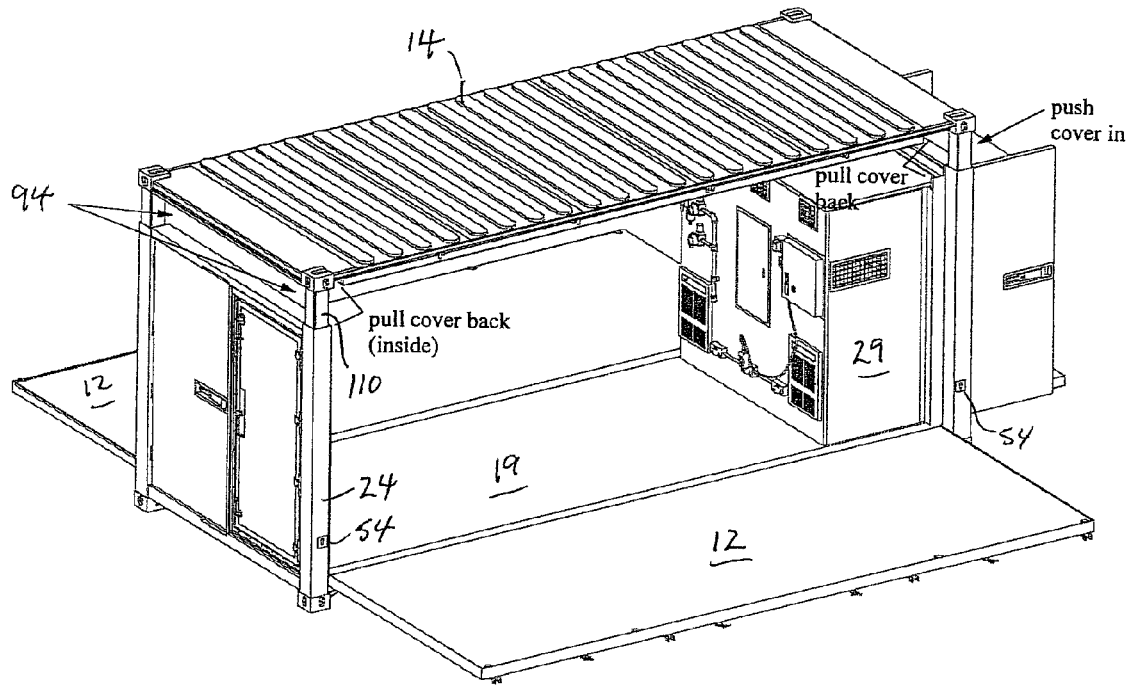
FIG. 14 is a perspective view of the invention with side walls in the horizontal position.
Figure 15:
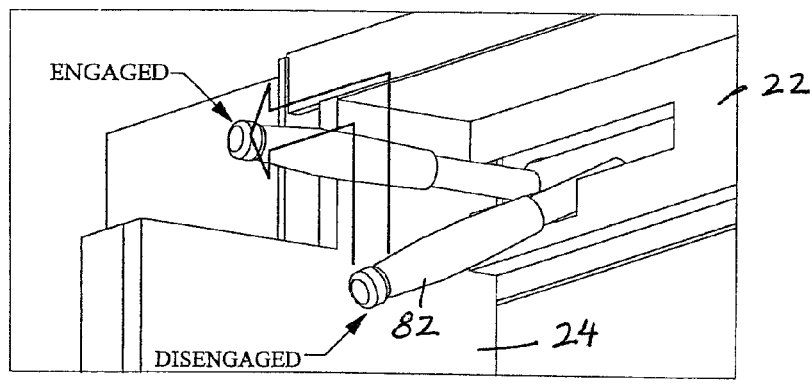
FIG. 15 is a perspective view of the corner locking pin.
Figure 16:
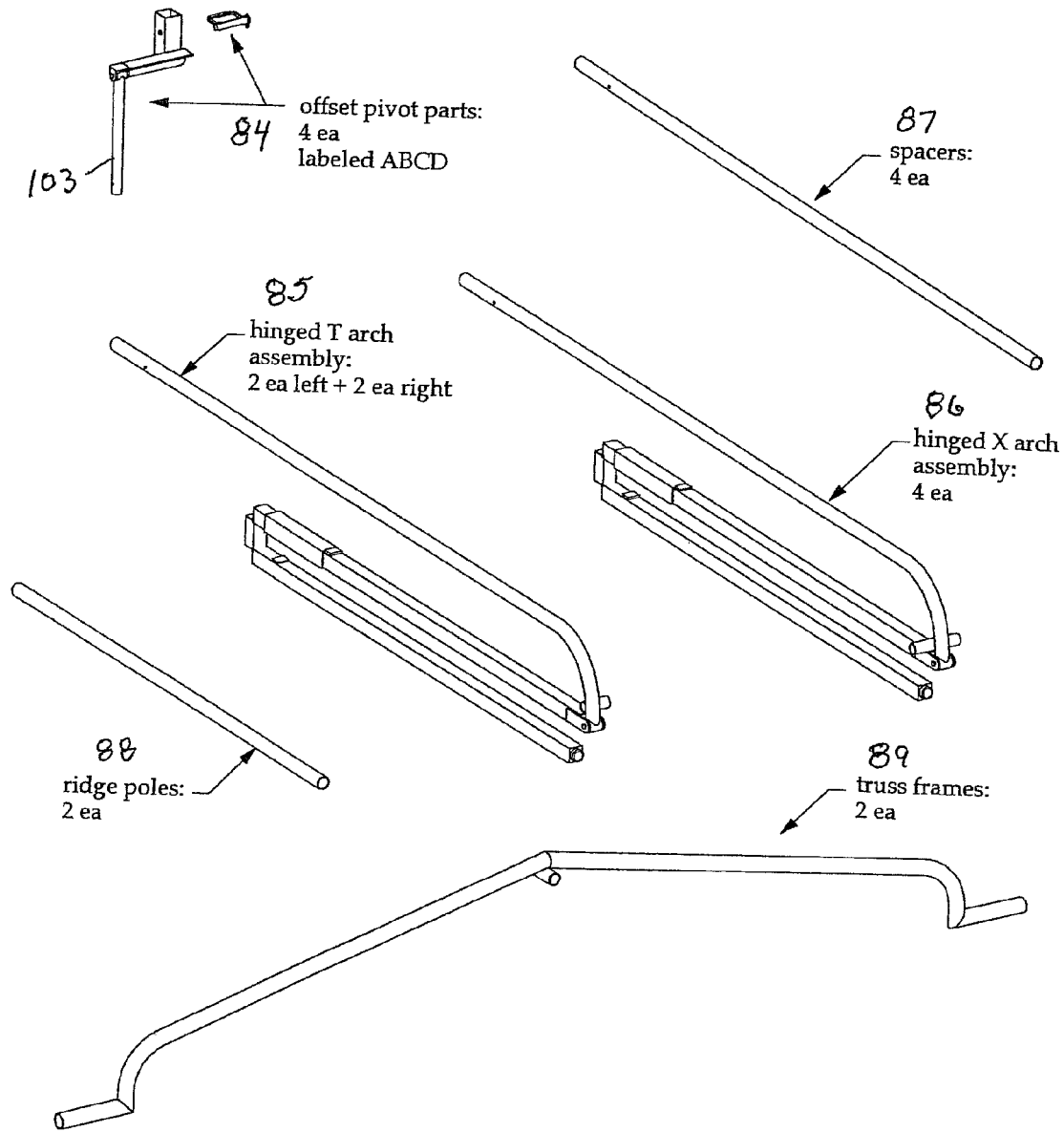
FIG. 16 is a perspective view of the roof support frame elements in disassembled state.
Figure 17:
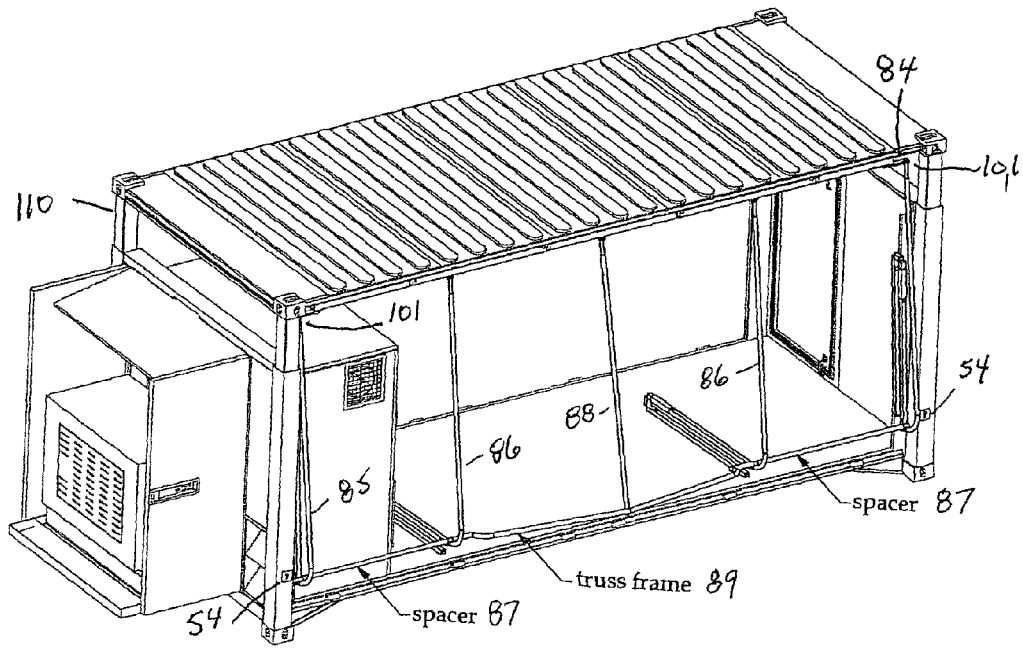
FIG. 17 is a perspective view of the invention with the roof partly raised and lowered side walls removed for ease of illustration and showing the roof cover frame in position for raising.
Figure 18:
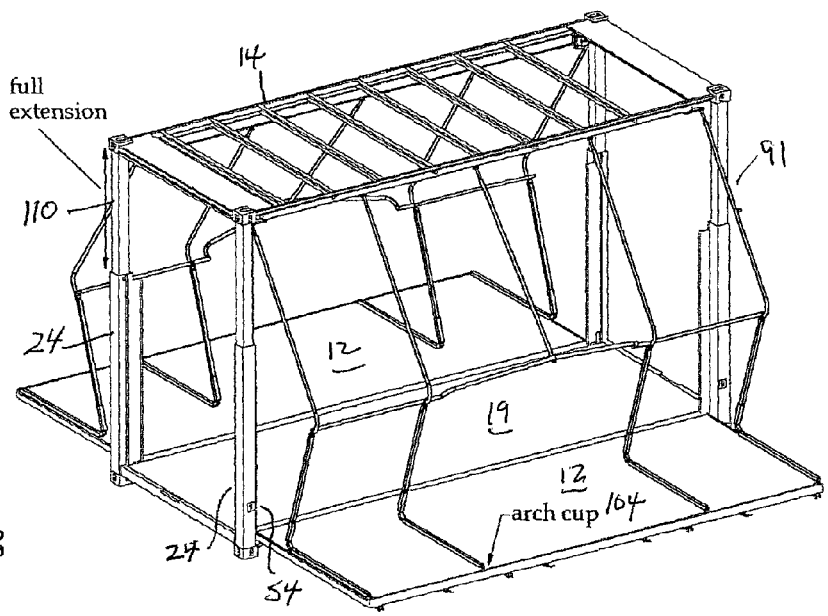
FIG. 18 is a perspective view of the invention with the roof fully raised and roof panels removed for ease of illustration and showing the roof cover frame in partly raised position.
Figure 21:
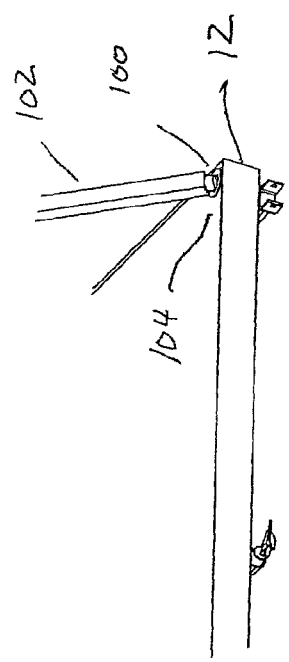
FIG. 21 is a detail view showing the joining of the roof cover frame to the wing extension.
Figure 20:
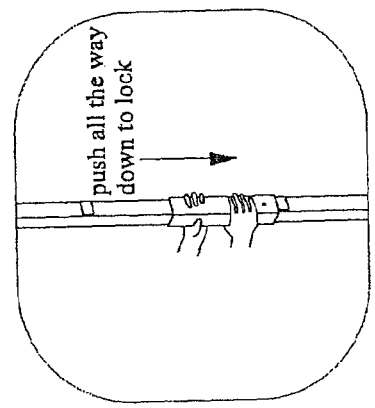
FIG. 20 is a detail view showing the roof cover frame hinge locks.
Figure 19:
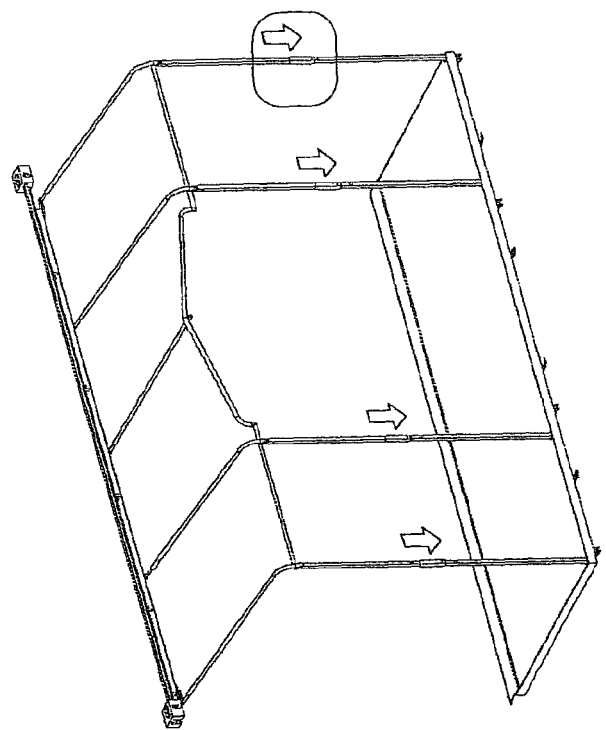
FIG. 19 is a detail perspective view of a roof cover frame in fully raised position.

Once the sides are lowered and leveled the roof can be raised as follows. Lock pins 82 at each of the four corners are disengaged (FIG. 15). Lock pins 82 are located on the inner surface of cross members 22 adjacent each corner vertical rail 24 and control spring bolts 114 (FIG. 23). The hydraulic pump is turned on (FIG. 3) using on switch and controlled using hand control 33. The roof is then raised slightly as shown in FIG. 14, for example 18 inches (500 mm) FIG. 16 illustrates the disassembled elements of a hinged frame for supporting the fabric cover 90. It comprises offset pivot parts 84, hinged T arch assembly 85, hinged X arch assembly 86, spacers 87, ridge poles 88 and truss frames 89. The hinged frame is assembled and connected to the roof as shown in FIG. 17. The offset pivot parts are attached to the upper rail 21 at each corner 101 and have a pivoting piece 103 to which the T-arches 85 are attached. The roof is then raised by the hydraulic control to its full 4-foot extension, thereby raising the cover frame to the position shown in FIG. 18. The hinges on each vertical leg are then locked as shown in FIGS. 19 and 20 and studs 100 on the lower ends of the vertical frame members 102 positioned in cups 104 in the floor of the pivoting floor wing extensions 12 (FIG. 21), thereby forming a rigid cover-supporting frame 91.

Figure 4:
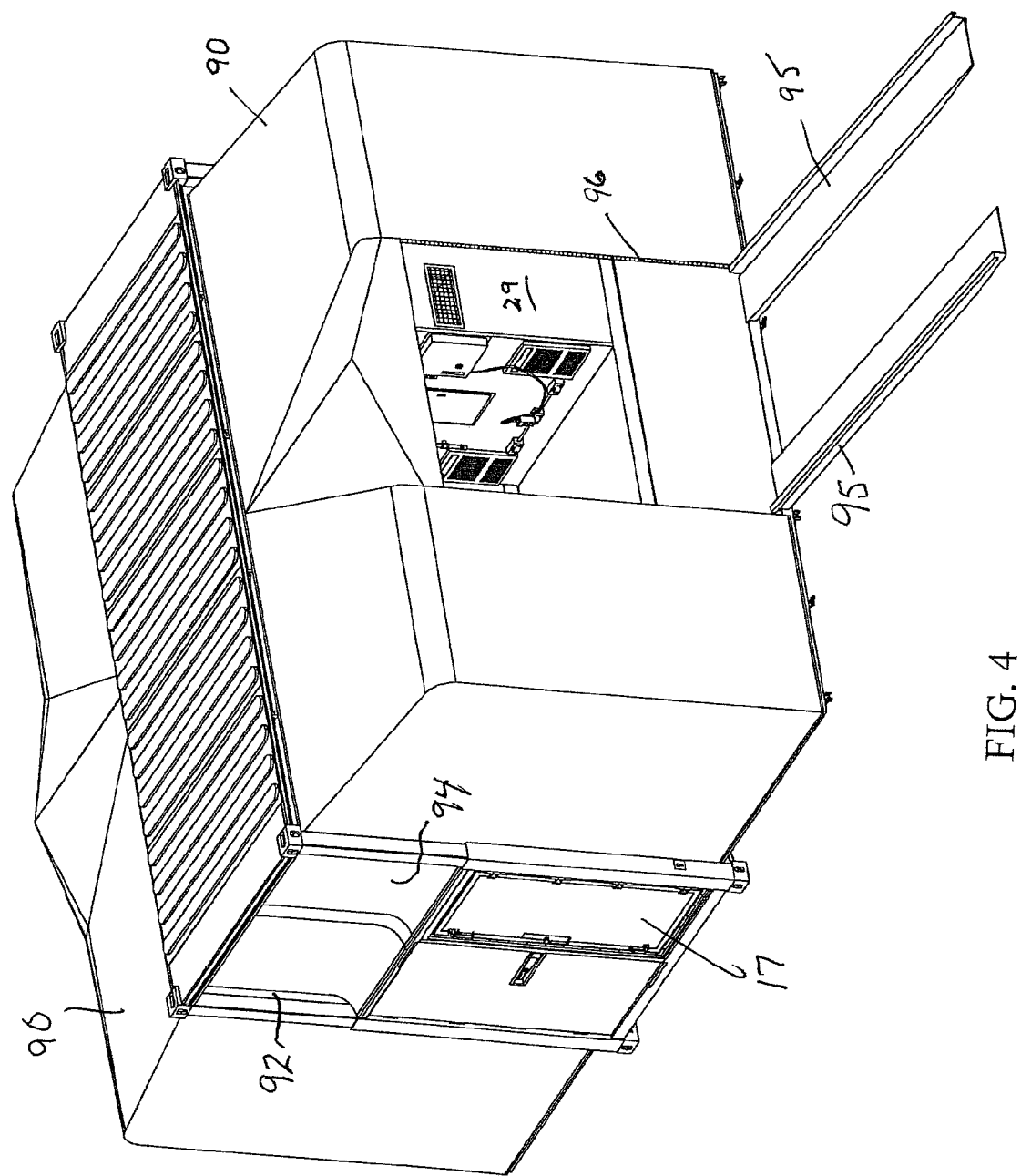
FIG. 4 is a perspective view of the invention with roof raised and cover deployed.

A fabric cover 90 as shown in FIG. 4 is then secured over frame 90. Cover 90 may be made of a waterproof PVC-coated polyester or the like, which may be insulated. Cover 90 is attached along the edges of side wall 12 and along the edges of the rails 24, 22. The fabric cover 90 thus provides a waterproof seal over the floor area formed by the wing extensions. Fabric cover 90 may be provided with a zippered opening 96 for entrance and exit purposes and/or windows and screens. Vehicle ramps 95 may be provided to permit entry of a vehicle. The end openings 92 formed by the raised roof have a permanently attached fabric cover 94 which folds into the interior of the container when the roof 14 is lowered. A standard door 17 may also be used as an entrance/exit.

To collapse the structure to its shipping configuration, the foregoing steps are reversed. The fabric cover 90 is removed, hinges on frame 91 are unlocked, the roof is lowered hydraulically to the position shown in FIG. 17, the frame 91 is disassembled and removed, the roof is fully lowered, locking pins 82 are engaged, and side walls 12 are raised by winches to a vertical position. Side walls 12 are then latched in the vertical position by anti-racking latch bars 40. The container can then be shipped by truck, rail, ship, helicopter or airplane as a standard ISO shipping container.

Further details of the hydraulic system for extending the corner rails to raise the roof are shown in FIG. 22-24. Inner posts 110 slide telescopically within the hollow interior 111 of outer rails 24, centered by contact with Ultra-High Molecular weight pads 112. Hydraulic cylinders 116 are activated by the hydraulic control 33 to extend as in FIG. 24, or retract as in FIG. 23, and have hydraulic connection 9 and are attached to the inner post at 2 and the outer post at 3. Spring bolt 114 is controlled either by a lock pins 82 or a central handle 115 as shown in FIG. 23 controlling two spring bolts 114. Spring bolt 114 either prevents the inner post from extending or releases it to extend under the force of hydraulic cylinders corner rails are shown in FIG. 15.

The foregoing extendible height structure can also be applied to containers not having one or more pivoting sides or fabric cover. In that case sides 12 may be fixed, without hinges. The extending container roof would operate otherwise as described above. Fixed covers could be provided for the lengthwise openings formed when the roof is extended in the same way as provided for the openings 92 at the end of the container described above. In this way a container's interior space can be expanded for storage when not in shipment and retracted to standard ISO dimensions for shipment.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within its true spirit and scope.

What is claimed is:

1. A method of constructing a shelter comprising walls, a floor and a roof enclosing a living space from a portable collapsible shelter, wherein said portable, collapsible shelter comprises:
   i) a rigid, hollow container comprising opposed ends, opposed vertical sides, a horizontal top and bottom and four corner rail elements, and wherein said corner rail elements each comprise outer and inner telescopic elements, each said inner element being secured at its upper end to said horizontal top and being reversibly telescopically slidable within said outer element between a lowered position for transit and an extended position when not in transit;
      said ends, sides, top and bottom being secured to form a rigid container having ISO Series 1 freight container external dimensions and corner fitting locations when said inner telescopic elements are in said lowered transit position;
   ii) at least one of said vertical sides comprising a pivoting wall portion hingedly connected to said vertical side along the lower edge of said pivoting wall portion to pivot between a closed vertical position whereby said pivoting wall portion forms part of said at least one of said vertical sides of the container when said inner telescopic elements are in said lowered position for transit and an open horizontal position, said pivoting wall portion having an outer edge, and whereby an opening is formed in said vertical side when said pivoting wall portion is in the horizontal position;
   iii) means associated with said container and with said pivoting wall portion for releasably securing said pivoting wall portion in said vertical position;
   iv) means adapted to support said pivoting wall portion for releasably maintaining said pivoting wall portion in said horizontal position;
   v) a foldable frame for supporting a flexible cover above said pivoting wall portion while said pivoting wall portion is in said lowered horizontal position and said inner element is in said extended position, said foldable frame being removably attached to said outer edge of said pivoting wall portion and to said container when said pivoting wall portion is in said lowered horizontal position; and
   vi) a flexible cover removably secured to said foldable frame, to the edges of said pivoting wall portion and to the edges of said opening in said vertical side to be thereby supported above said pivoting wall portion when said pivoting wall portion is in said lowered horizontal position thereby forming an enclosed space above said pivoting wall portion open to the interior of said container when said pivoting wall portion is lowered to the horizontal position;

said method comprising:
   a) lowering at least one pivoting side wall portion hingedly connected along one edge thereof from a closed vertical position to an open horizontal position;
   b) partially extending each said inner telescopic element;
   c) attaching said foldable frame to said outer edge of said pivoting wall portion and to said container when said pivoting wall portion is in said lowered horizontal position;
   d) further extending each said inner telescopic element to its fully extended position;
   e) securing each said inner telescopic member and said foldable frame in said fully extended position; and
   f) installing said flexible cover on said foldable frame.

2. The method of claim 1 wherein said portable collapsible shelter further comprises power means for reversibly telescopically lowering and extending each said inner element within said outer element.

3. The method of claim 2 wherein said power means for reversibly telescopically lowering and extending each said inner telescopic element within each said outer telescopic element comprises a hydraulic cylinder.

4. The method of claim 1 wherein said portable collapsible shelter further comprises means for raising and lowering said pivoting wall portion.

5. The method of claim 4 wherein said means for raising and lowering said pivoting wall portion comprises a cable connected to said pivoting wall portion and winching means.

6. The method of claim 1 wherein said foldable frame comprises rigid or semi-rigid beams attached to said container at either end of said beams.

7. The method of claim 1 wherein said flexible cover is constructed from a fabric material.

8. The method of claim 1 wherein said flexible cover when supported on said foldable frame extends from an edge of said horizontal top above said pivoting wall portion while said pivoting wall portion is in said lowered horizontal position and is secured to said container around said opening and to outer edges of said pivoting wall portion.

9. The method of claim 1 wherein said foldable frame comprises a collapsible frame secured at a lower end thereof to said pivoting wall portion and at an upper end thereof to said container.

10. The method of claim 1 wherein said portable collapsible shelter further comprises a flexible cover extending between a top edge of one of said end walls and an edge of said horizontal top when said inner telescopic elements are in said extended position.

\* \* \* \* \*